UNITED STATES PATENT OFFICE.

DAVID BROOKS, JR., OF PHILADELPHIA, PENNSYLVANIA.

INSULATING MATERIAL FOR ELECTRIC WIRES.

SPECIFICATION forming part of Letters Patent No. 352,852, dated November 16, 1886.

Application filed May 1, 1886. Serial No. 200,851. (No specimens.)

*To all whom it may concern:*

Be it known that I, DAVID BROOKS, Jr., a citizen of the United States, residing in the city and county of Philadelphia, State of Pennsylvania, have invented a new and useful Improvement in Insulating Material for Electric Wires, which improvement is fully set forth in the following specification.

My invention consists of an insulating material for electric wires, consisting of rosin-oil and in combination therewith rosin, the same being inexpensive, durable, flexible, and of a highly insulating nature.

In carrying out my invention I take equal parts of rosin and rosin-oil, the rosin being preferably that known as the "first run," and place them in a suitable tank or vessel, to which heat is applied, whereby the rosin melts and unites with the oil, forming a plastic or semi-fluid mass, which may be used while yet hot or kept for future use, when it will require reheating.

The wire or cable to be insulated is placed in the hot mass, whereby its fibrous covering is saturated with the same and thoroughly coated, it being found that the compound or material is of a flexible, highly insulating, and inexpensive nature, and as it is free of mineral and other acids it is durable and preservative and not liable to destroy the fibrous covering of the wire or cable, it also being capable of enduring heat, to which it is subjected while the wire or cable saturated or coated with the same is incased with lead or other metal in a hot condition.

I am aware that rosin has been used as an ingredient, in combination with other elements of different qualities, in insulating compounds, and also that a small percentage—from two to five—of rosin-oil has been employed in a compound of which lime-powder formed a principal ingredient, for the purpose of forming the same into a fixed mass; but I not aware that it is old to form a compound for insulating purposes composed of equal parts of rosin and rosin-oil, as set forth in the specification.

Having thus described my invention, what I claim as new, and desire to secure by Letters Patent, is—

An insulating material for electric wires, composed of rosin and rosin-oil, in about equal proportions, substantially as described.

DAVID BROOKS, JUNR.

Witnesses:
JOHN A. WIEDERSHEIM,
A. P. GRANT.